United States Patent [19]

Bizic

[11] Patent Number: 4,741,439
[45] Date of Patent: May 3, 1988

[54] CASSETTE FOR PHOTOGRAPHIC STRIP MATERIAL

[75] Inventor: Milan Bizic, Dänikon, Switzerland

[73] Assignee: GRETAG Aktiengesellschaft, Regensdorf, Switzerland

[21] Appl. No.: 890,274

[22] Filed: Jul. 29, 1986

[30] Foreign Application Priority Data

Jul. 30, 1985 [CH] Switzerland .................. 3290/85

[51] Int. Cl.⁴ .................................. G03B 27/48
[52] U.S. Cl. ........................ 206/316; 206/397; 206/408; 235/449; 242/55.53; 242/75.4; 354/275
[58] Field of Search ............... 206/316, 389, 397–406, 206/408, 409, 411, 413–416; 220/327; 235/449; 352/242; 353/26 A, 119; 354/275, 331, 341–343, 345; 365/97; 242/55, 55.53, 57.1, 68.1, 68.4, 68.5, 68.7, 71, 71.1, 71.2, 71.3, 71.7, 72.1, 73, 75, 75.2, 75.4, 83, 195, 197; 355/75

[56] References Cited

U.S. PATENT DOCUMENTS

| | | | |
|---|---|---|---|
| 2,389,495 | 11/1945 | Forssell | 206/414 |
| 3,036,207 | 5/1962 | Endelson | 220/327 |
| 3,212,729 | 4/1963 | Putnam . | |
| 3,353,660 | 11/1967 | Will | 206/406 |
| 3,612,424 | 3/1970 | Friedel . | |
| 3,683,762 | 8/1972 | Maynard et al. . | |
| 4,534,519 | 8/1985 | Euteneuer et al. . | |
| 4,581,525 | 4/1986 | Horstmann | 235/449 |

FOREIGN PATENT DOCUMENTS 0145813 12/1983 European Pat. Off. .
1258268 6/1963 Fed. Rep. of Germany .
2048684 4/1972 Fed. Rep. of Germany .

*Primary Examiner*—Jimmy G. Foster
*Attorney, Agent, or Firm*—Burns, Doane, Swecker & Mathis

[57] ABSTRACT

A cassette housing for a roll of photographic strip materials, the housing consisting of two frontal plates with integrated bearing lugs for the wound strip material and a jacket, all of the parts being held together by a single axial threaded bolt with a pivoting handle and having a stationary guide plate and an axially moveable guide plate to effect the optimum alignment and guidance of the roll.

14 Claims, 3 Drawing Sheets

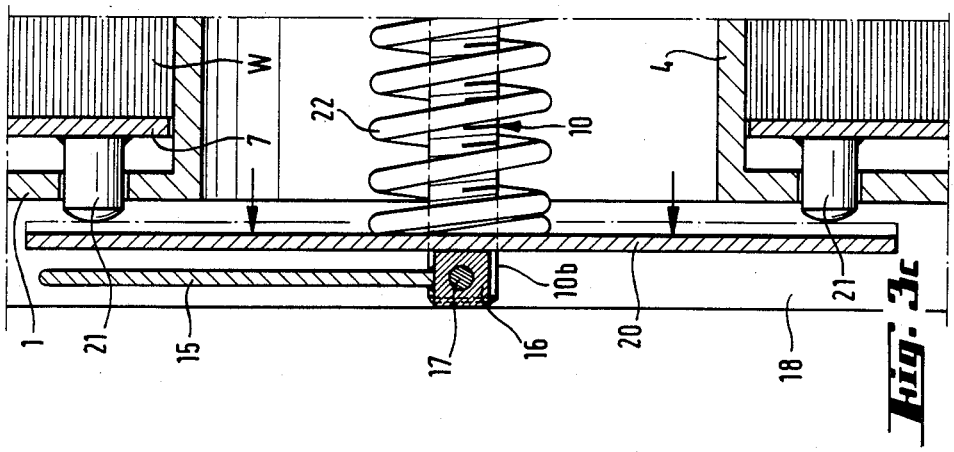
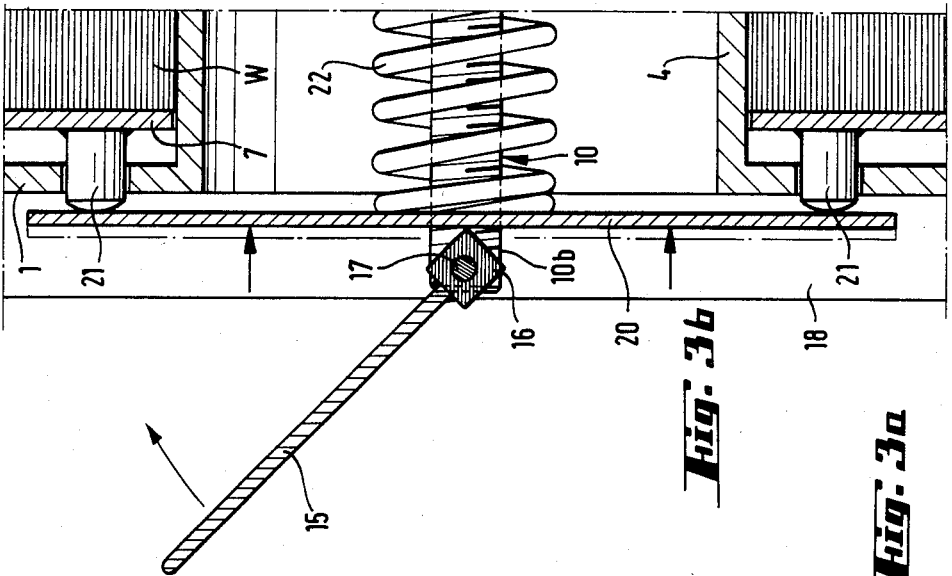
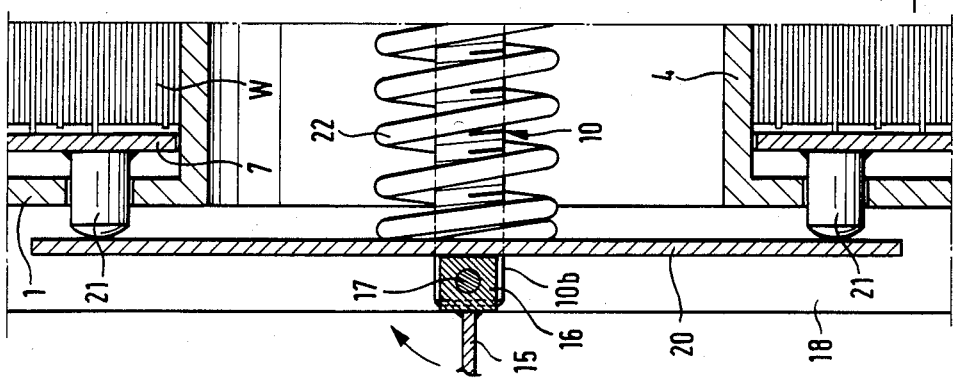

ic strip
CASSETTE FOR PHOTOGRAPHIC STRIP MATERIAL

BACKGROUND OF THE INVENTION

The invention concerns a cassette for a roll of photographic strip materials.

Cassettes of this type are known in numerous configurations. They are used primarily in photographic laboratories in combination with more or less automated copying devices, to which they may be attached on the inlet side to supply them with unexposed photographic paper. Certain cassettes are designed so that they may be attached to the copying device on the outlet side also and are thus capable of accepting exposed copy materials from the copying device.

OBJECT AND SUMMARY OF THE INVENTION

It is the object of the present invention to provide a novel cassette having particular simplicity of design, great ease of operation and very high functional reliability.

To satisfy the above mentioned object there is provided a cassette comprising a housing having two opposing frontal plates and a jacket connecting them with each other in a light-tight manner, each of the frontal plates being equipped with an inwardly protruding, essentially cylindrical lug arranged coaxially with respect to each other and together forming a bearing arbor to receive and rotatably support a roll of photographic strip materials, at least one of the frontal plates being removable from the remaining parts of the housing to open the cassette and, further including a closure element operatively connected to said lugs, said two frontal plates being releasably connected to each other by means of said closure element.

DESCRIPTION OF THE DRAWING

FIG. 3a to 3c are detailed views of the cam element taken along section III—III in FIG. 2 in three different pivoting settings of the cam element.

DETAILED DESCRIPTION

Figure 1:
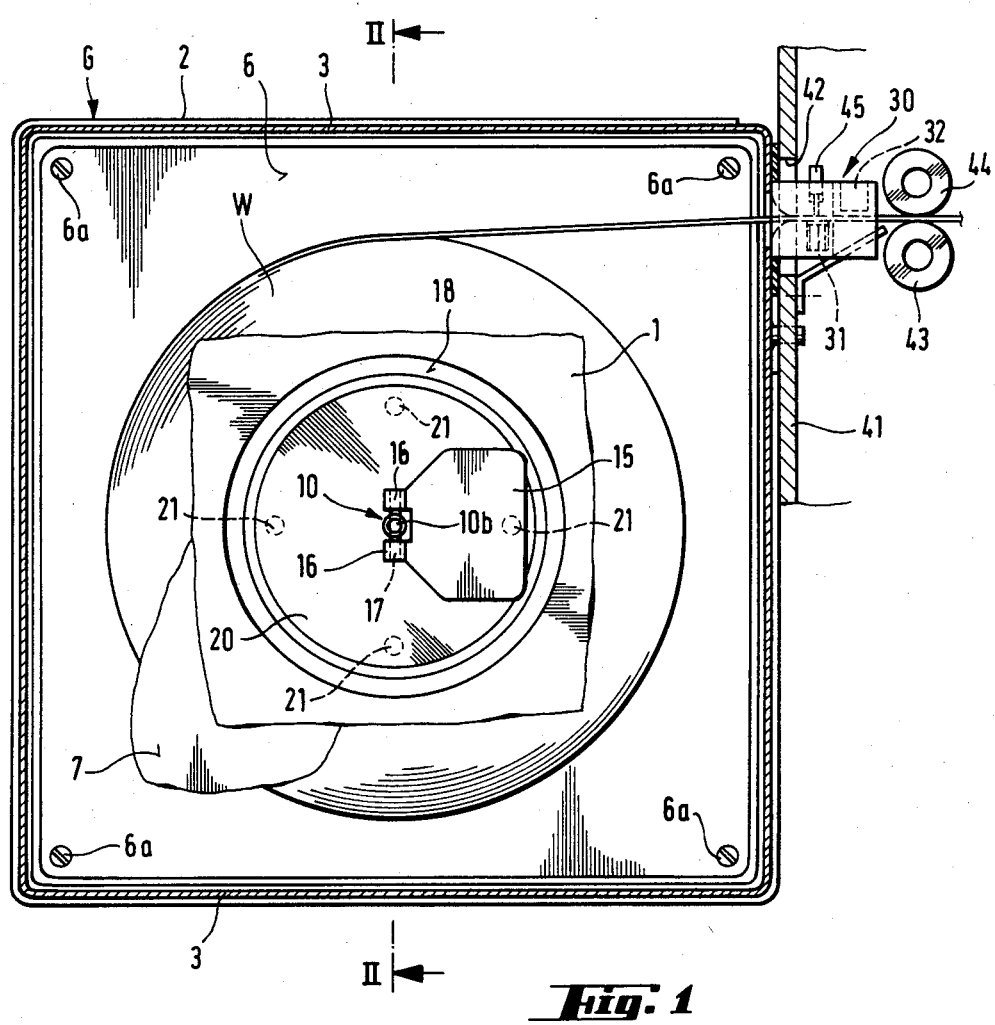
FIG. 1 is a front elevational view partially sectioned along section line I—I in FIG. 2 of a cassette according to the invention.
Figure 2:
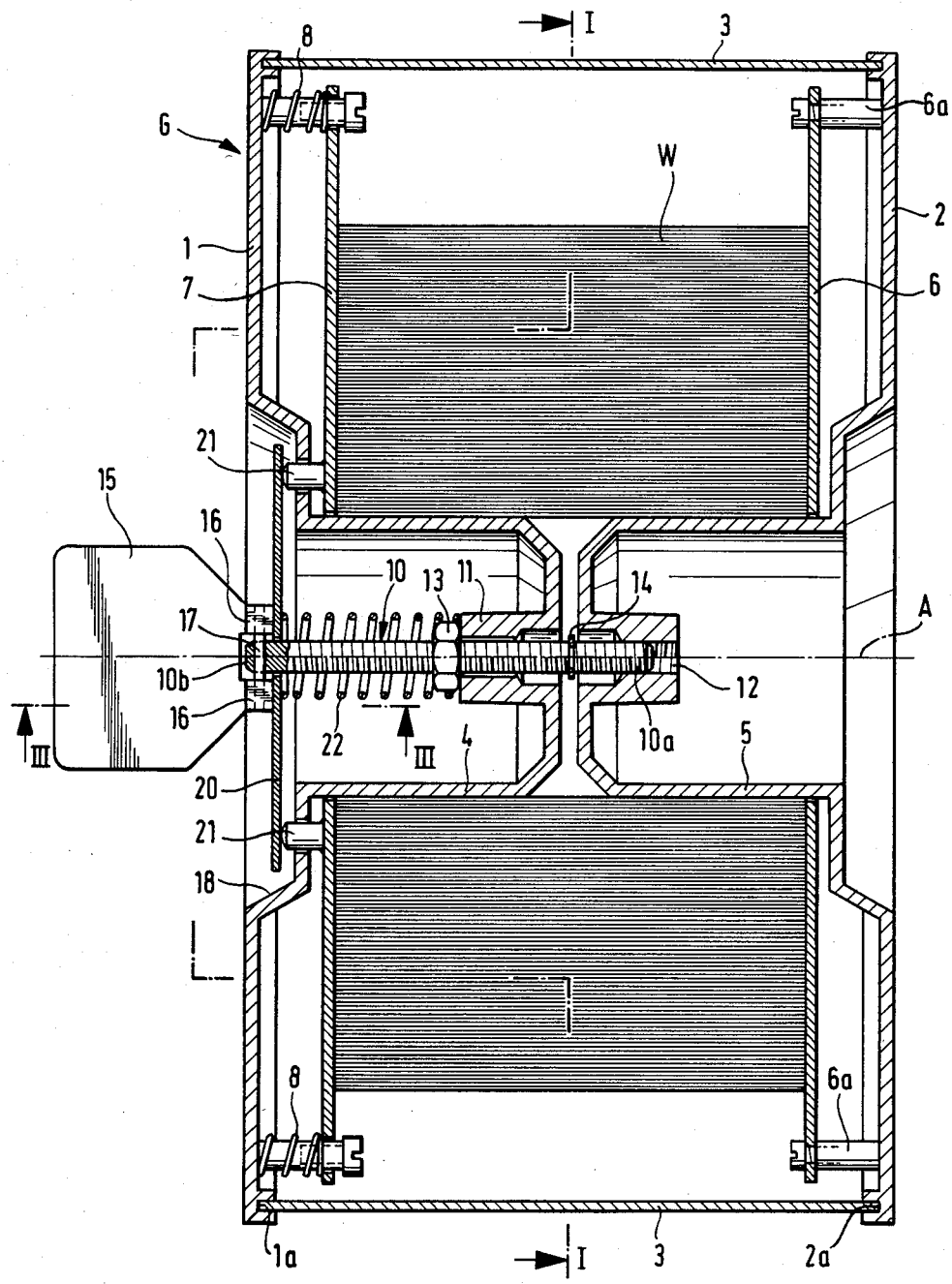
FIG. 2 is a cross-sectional view taken along section II—II in FIG. 1.

As seen clearly in FIGS. 1 and 2, the housing G of the cassette shown is constructed in an extremely simple manner. It consists essentially of only three parts, i.e. two practically identical frontal plates 1 and 2 and a circumferential jacket 3 held in the circumferential grooves 1a and 2a of the frontal plates 1 and 2.

Each of the two frontal plates has a projection in the form of a hollow, cylindrical lug 4 and 5. The lugs are coaxial and together form the bearing arbor for the roll W of the photographic strip material to be held in the cassette.

Guide plates 6 and 7 are mounted on the inside of the frontal plates 1 and 2, spaced apart and parallel to each other for guidance on the front side of the roll W. The guide plate 6 is mounted by means of fixed spacer bolts 6a stationarily in relation to the frontal plate 2. The guide plate 7, on the other hand, is displaceable in the direction of the axis A of the lugs and the bearing arbor, while springs 8 fastened to the associated frontal plate 1 are provided to urge the guide plate 7 under a predetermined constant pressure laterally against the roll W, thereby accurately guiding and braking it to the extent required.

A single closure element is provided in the form of a threaded bolt 10 to hold the cassette housing G together; it extends coaxially to the cylindrical lugs 4 and 5. The bolt 10 is supported rotatably in a bearing bushing 11 molded onto the lug 4 and engages with its threaded end 10a, a threaded bore hole 12 in the lug 5. A counter nut 13 and a retaining ring 14 limit the axial mobility of the threaded bolt in the bearing bushing 11. The threaded bolt 10 protrudes on the side of the frontal plate 1 from the housing G and carries at its end 10b a plate-like rotating element 15. This rotating element or manual handle is equipped with a cam element 16 the function thereof is described hereinbelow, and is fastened at the extreme end 10b of the threaded bolt 10 pivotally and hingedly to a pivoting axle 17 perpendicular to said bolt 10. In one of its extreme positions (FIG. 2) the manual handle 15 is parallel to the threaded bolt 10 and may be actuated to rotate the latter (working position). In the other extreme position (FIG. 1) it is pivoted by 90 to rest parallel to the frontal plate 1 and is recessed in a trough-like recess 18 of the frontal plate 1, thereby becoming essentially flush with the surface of the frontal plate surrounding the recess. This extreme position is the rest position assumed upon the insertion of the cassette.

A coupling plate 20 is provided in the trough-shaped recess 18, which by means of the spacing bolts 21 projecting through recesses in the frontal plate 1 is connected under pressure with the guide plate 7 inside the housing. The spacing bolts 21 are fastened only to the guide plate 7 and not to the coupling plate 20. In the closed state of the cassette the coupling plate 20 is abutting, as shown in FIG. 2, elastically against the cam element 16 on the manual handle 15, which has an approximately square cross-section, under the effect of a compression spring surrounding the threaded bolt 10, while the spacing bolts 21 are not in contact with the coupling plate 20. It may be seen from the configuration of the cam element 16 that the coupling plate 20 in the two extreme positions of the manual handle (FIG. 3a and 3c) is located as far outside and the guide plate 7 as close to the associated frontal plate 1 as possible. However, during the up or down pivoting of the manual handle 15 the coupling plate 20 is being moved temporarily inward, together with the guide plate 7 by means of the spacing bolts 21, against the effect of the compression spring 22 (FIG. 3b). This inward motion applies an aligning effect to the roll, i.e. occasional protruding layers of the roll are cleanly aligned and made flush. It is of advantage here that the alignment of the roll takes place automatically upon the closing of the cassette housing without the need for any particular manual action.

In order to insert a roll W the threaded bolt 10 is released until it is out of contact with the threaded bore hole 12 in the lug 5 and then the frontal plate 1 is removed. Following the insertion, the frontal plate 1 is remounted and the threaded bolt 10 tightened with the manual handle 15, until the housing is tightly closed. After the handle 15 has been switched to its rest position, the roll W is automatically aligned in the manner mentioned above.

The jacket 3 of the cassette housing has on one side of its upper part a laterally protruding connecting sleeve 30 to be inserted into a corresponding connecting orifice in an automatic copying device, thereby attaching the cassette in a light-tight manner. The strip material in the cassette is conducted to the copying device through the sleeve 30. The sleeve 30 contains a light-tight closure 31 which automatically opens when coupled with the copying device. The sleeve 30 further contains coding means in the form of, for example, four small permanent magnets 32 which may be evaluated by reading means, preferably Hall sensors with associated electronic elements, and which contain information concerning the width of the strip material being used. The use of small permanent magnets is a particularly simple and convenient coding method, which primarily makes it possible to alter the coded information in a very simple and convenient manner. The magnets are arranged loosely in corresponding bore holes and to change the information, the desired number of permanent magnets is simply inserted in said bore holes in the arrangement and direction of polarization desired, with the code representing the information being formed by the presence and polarization direction of the permanent magnets. Thus, for example with four permanent magnets 81 different information may be coded.

In FIG. 1 the coupling of the cassette to a copying device is illustrated. Of the copying device, only a side wall 41 with an insertion orifice 42 for the connecting sleeve 30 and a pair of transport rollers 43 and 44 for the strip materials and an input slope 45 to actuate the light-tight closure in the sleeve 30 of the cassette indicated by 31, are shown. The permanent magnets are symbolized by the position 32.

The above-described cassette according to the invention is extremely simple in design, highly reliable in operation and may be manipulated in a very simple manner.

The principles, preferred embodiments and modes of operation of the present invention have been described in the foregoing specification. the invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A cassette for a roll of photographic strip material comprising:
    a housing having two opposing frontal plates and a jacket connecting them with each other in a light-tight manner, each of the frontal plates being equipped with an inwardly projecting, essentially cylindrical lug arranged coaxially with respect to each other and together forming a bearing arbor to receive and rotatably support said roll of photographic strip material;
    at least one of the frontal plates being removable from the remaining parts of the housing to open the cassette and further including a closure element operatively connected to said lugs, said two frontal plates being releasably connected to each other by means of said closure element;
    each frontal plate having a guide plate that is perpendicular to the axes of the lugs for the frontal guidance of said roll of photographic strip material supported on the bearing arbor; and
    one of the guide plates being resiliently displaceable parallel to the axes of the lugs against said roll to be inserted in said housing to provide braking for such a roll.

2. A cassette for a roll of photographic strip material comprising:
    a housing having two opposing frontal plates and a jacket connecting them with each other in a light-tight manner, each of the frontal plates being equipped with an inwardly projecting, essentially cylindrical lug arranged coaxially with respect to each other and together forming a bearing arbor to receive and rotatably support said roll of photographic strip material;
    at least one of the frontal plates being removable from the remaining parts of the housing to open the cassette and further including a closure element operatively connected to said lugs, said two frontal plates being releasably connected to each other by means of said closure element;
    said closure element comprising a threaded bolt that is generally coaxial with respect to said lugs, said bolt being rotatably supported in one of said lugs and engaging a threaded bore hole in the other of said lugs;
    each frontal plate having a guide plate that is perpendicular to the axes of the lugs for the frontal guidance of said roll of photographic strip material supported on the bearing arbor; and
    one of the guide plates being resiliently displaceable parallel to the axes of the lugs against said roll to be inserted in said housing to provide braking for said roll.

3. A cassette for a roll of photographic strip material comprising:
    a housing having two opposing frontal plates and a jacket connecting them with each other in a light-tight manner, each of the frontal plates being equipped with an inwardly projecting, essentially cylindrical lug arranged coaxially with respect to each other and together forming a bearing arbor to receive and rotatably support said roll of photographic strip material;
    at least one of the frontal plates being removable from the remaining parts of the housing to open the cassette and further including a closure element operatively connected to said lugs, said two frontal plates being releasably connected to each other by means of said closure element;
    each frontal plate having a guide plate that is perpendicular to the axes of the lugs for the frontal guidance of said roll of photographic strip material supported on the bearing arbor;
    one of the guide plates being resiliently displaceable parallel to the axes of the lugs against said roll to be inserted in said housing to provide braking for said roll; and
    means for moving the displaceable guide plate from outside the cassette a given distance in the direction away from the associated frontal plate and back toward said frontal plate.

4. A cassette according to claim 3 wherein said means comprises a manual handle located stationarily in relation to the associated frontal plate and further including a pivoting axle perpendicular to the axes of the lugs, said handle pivotable about said pivoting axle, said means further including a coupling plate outside of the associated frontal plate and parallel to the displaceable guide plate and in pressuring contact with said guide plate, said means further including a cam element connected to said manual handle, said cam element engaging said coupling plate and thereby capable of moving the displaceable guide plate as a function of the pivoting position of said manual handle to a greater or lesser extent in the direction of the inside of the cassette.

5. A cassette for a roll of photographic strip material comprising:
  a housing having two opposing frontal plates and a jacket connecting them with each other in a light-tight manner, each of the frontal plates being equipped with an inwardly projecting, essentially cylindrical lug arranged coaxially with respect to each other and together forming a bearing arbor to receive and rotatably support said roll of photographic strip material;
  at least one of the frontal plates being removable from the remaining parts of the housing to open the cassette and further including a closure element operatively connected to said lugs, said two frontal plates being releasably connected to each other by means of said closure element;
  said closure element comprising a threaded bolt that is generally coaxial with respect to said lugs, said bolt being rotatably supported in one of said lugs and engaging a threaded bore hole in the other of said lugs;
  each frontal plate having a guide plate that is perpendicular to the axes of the lugs for the frontal guidance of said roll of photographic strip material supported on the bearing arbor;
  one of the guide plates being resiliently displaceable parallel to the axes of the lugs against said roll to be inserted in said housing to provide braking for said roll; and
  means for moving the displaceable guide plate from outside the cassette a given distance in the direction away from the associated frontal plate and back toward said frontal plate.

6. A cassette according to claim 5 wherein said means comprises a manual handle located stationarily in relation to the associated frontal plate and further including a pivoting axle perpendicular to the axes of the lugs, said handle pivotable about said pivoting axle, said means further including a coupling plate outside of the associated frontal plate and parallel to the displaceable guide plate and in pressuring contact with said guide plate, said means further including a cam element connected to said manual handle, said cam element engaging said coupling plate and thereby capable of moving the displaceable guide plate as a function of the pivoting position of said manual handle to a greater or lesser extent in the direction of the inside of the cassette.

7. A cassette according to claim 6 wherein said manual handle is pivotably supported on the threaded bolt and is acting simultaneously as the rotating element for the threaded bolt.

8. A cassette according to claim 7 wherein the manual handle has an essentially plate-like configuration and the cam element is designed so that the manual handle may lock into two different pivoting positions in a stable manner, one pivot position being located essentially perpendicularly and the other pivot position essentially parallel to the threaded bolt wherein the guide plate in these two pivoting positions is at the least distance and that between these two pivoting positions at the greatest distance from the associated frontal plate.

9. A cassette according to claim 8 wherein the associated frontal plate includes a central-trough-shaped recess which is capable of receiving the coupling plate and in which the manual handle may be recessed.

10. A cassette according to claim 9 wherein each frontal plate is integral with a respective lug.

11. A cassette for a roll of photographic strip material comprising:
  a housing having two opposing frontal plates and a jacket connecting them with each other in a light-tight manner, each of the frontal plates being equipped with an inwardly projecting, essentially cylindrical lug arranged coaxially with respect to each other and together forming a bearing arbor to receive and rotatably support said roll of photographic strip material;
  at least one of the frontal plates being removable from the remaining parts of the housing to open the cassette and further including a closure element operatively connected to said lugs, said two frontal plates being releasably connected to each other by means of said closure element;
  a connecting sleeve projecting from the jacket, said sleeve capable of being inserted, in the course of the attachment of the cassette to a copying device, into a connecting orifice in such a copying device, said photographic strip material capable of being removed through said connecting sleeve and conducted to a copying device, said connecting sleeve including coding means which contain, in a coded form, information concerning the width of the strip material to be contained within the cassette and which are readable by reading means that may be provided in the copying device.

12. A cassette according to claim 11 wherein said information is formed by the arrangement and orientation of permanent magnets.

13. A cassette according to claim 11 wherein said connecting sleeve comprises a light-tight closure which is capable of automatically opening upon insertion into a connecting orifice of a copying device.

14. A cassette according to claim 12 wherein said connecting sleeve comprises a light-tight closure which is capable of automatically opening upon insertion into a connecting orifice of a copying device.

* * * * *